March 9, 1948.  R. E. BURROUGHS  2,437,374
MAGNETIC FIELD MEASURING DEVICE
Filed May 15, 1945
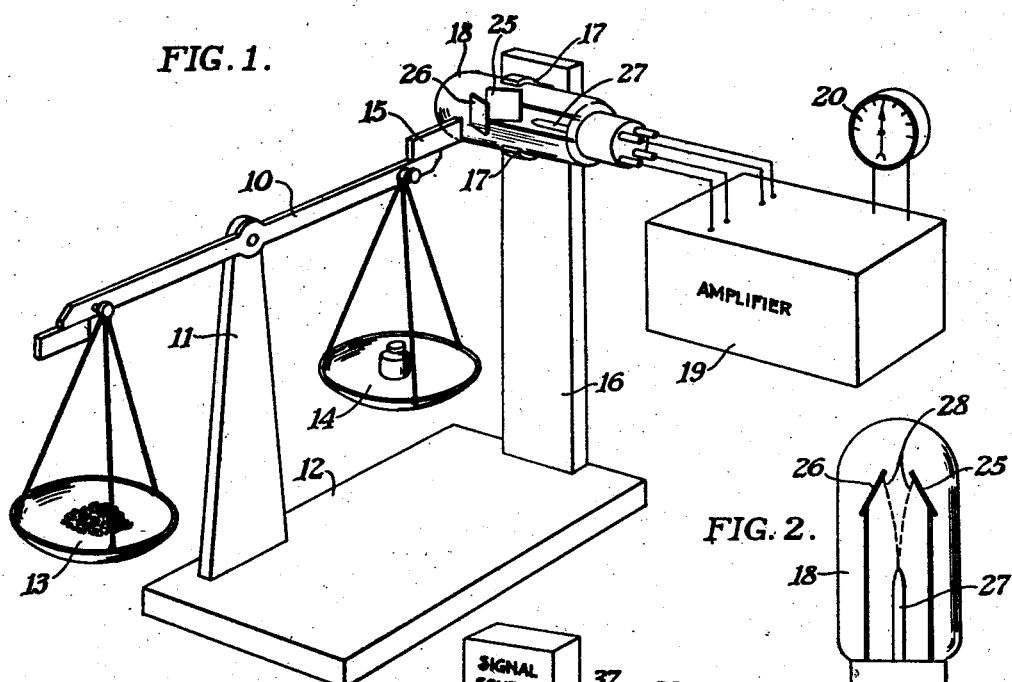
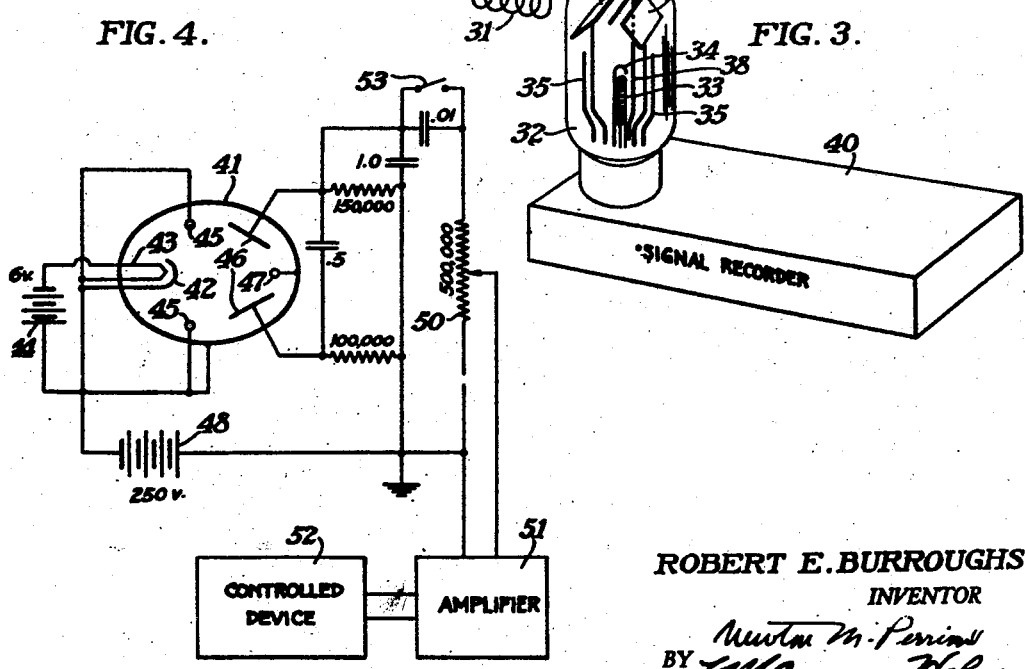
ROBERT E. BURROUGHS
INVENTOR
BY *Newton M. Perrin*
*J. M. Emerson Holmes*
ATT'Y & AG'T Patented Mar. 9, 1948

2,437,374

UNITED STATES PATENT OFFICE 2,437,374

MAGNETIC FIELD MEASURING DEVICE

Robert E. Burroughs, Washington, D. C., assignor to Eastman Kodak Company, Rochester, N. Y., a corporation of New Jersey Application May 15, 1945, Serial No. 593,779

1 Claim. (Cl. 175—183)

This invention relates to devices for measuring the relative position of two objects. It involves a very neat and compact arrangement for doing just this and it has general application in innumerable fields. The invention was developed first in connection with a lead computing sight for anti-aircraft fire, but since the invention is independent of the use to which the measurement is put, it is most clearly describable with respect to some simple mechanism, such as a weighing scale.

The primary object of the invention is to provide a device for measuring the relative positions of two objects. A collateral object is to provide means for measuring a magnetic field or the change in a magnetic field in which the results of the measurement may be indicated directly as on a meter or on a recorder or may be used in any of the well-known ways to control a relay switch or a motor which is connected to adjust the position of the two objects to some predetermined arrangement. For example, one object arranged as a master object may be moved to some position and a second object as a slave thereto may be made to follow the master object by suitable motors controlled by the present invention.

According to the present invention a device for measuring the relative position of two objects is made up of means such as a magnet, for producing a magnetic field attached to and carried by one of the objects and an electronic tube whose response is dependent on the ambient magnetic field, attached to and carried by the other object. The output of the tube is connected to some means such as a meter or switch or other control mechanism indicating the response of the tube. One preferred form of the invention employs an electronic tube with two anodes resulting in two plate currents whose relative values are proportional to at least a component of the ambient magnetic field. The two anodes and the cathode of the tube geometrically define a plane (common to the three electrodes) and the component of any magnetic field perpendicular to this plane will operate on the electron stream from the cathode so as to urge it more toward one of the anodes than toward the other. The tube detects any changes in this field and is most sensitive to changes in field strength near the cathode.

In the preferred form of the invention the electronic tube has additional electrodes on either side of the electron stream for concentrating or compressing this stream and thus for increasing the efficiency of the tube. It is also preferable to have still another electrode between the two anodes to act as a suppressor and to render the two portions of the electron stream more critically distinct; due to this suppressor electrode the shift of the electron stream from one anode to the other as the magnetic field changes is more sudden.

The invention and its objects and advantages will be fully understood from the following description of the specific embodiments thereof, when read in connection with the accompanying drawing in which:

Fig. 1 illustrates partly in perspective a simple embodiment of the invention.

Fig. 2 illustrates schematically the electron tube used in Fig. 1.

Fig. 3 shows an embodiment of the invention for measuring varying magnetic field, employing a preferred form of electronic tube.

Fig. 4 is a schematic circuit diagram of a preferred embodiment of the invention.

In Fig. 1 a balance arm 10 pivoted on an upright post 11 carries balance pans 13 and 14. This simple embodiment of the invention was selected for purposes of illustration since it is much clearer than any of the more complicated devices in which the relative position of two objects is extremely critical and which therefore greatly need the present invention. In the present case the two objects whose relative position is to be measured are one end of the balance arm 10 and the base 12 of the instrument. On one of these objects, namely on the balance arm 10 there is mounted a permanent magnet 15 which creates a magnetic field which moves up and down as the balance arm 10 moves. By means of an upright post 16 and clamps 17 there is mounted on the other object (the base 12) an electronic tube 18 whose response is dependent on the ambient magnetic field.

As shown in Fig. 2 this electronic tube 18 consists primarily of two anodes 25 and 26 each of which receives an electronic stream represented by broken lines 28 from a cathode 27. The relative value of these two currents or their difference as amplified by amplifier 19 is indicated on a meter 20. When the magnet 15 is symmetrically located with respect to the two electron streams so that the two anode currents are equal, the meter 20 indicates zero which represents the balance point of the weighing scale. When the magnet 15 moves up or down, one plate current increases, the other decreases, which alters the reading of the meter 20. The sensitivity of the device depends on the strength of the magnetic field introduced by the magnet 15, the characteristics of the electronic tube and the amount of amplification that is used. Obviously the sensitivity can be made to have almost any desired value. In practice the orientation of the tube and magnet is not too critical, since it is almost impossible to find an arrangement which is insensitive to the magnet movement, but obviously some positions are more sensitive than others since some cause greater effective changes in field strength (magnetic flux) for the same movement of the magnet. A sensitive position is selected and then a zero adjustment is made either electrically or on the balance itself in the usual way.

In Fig. 3, a preferred form of electronic tube is illustrated which is applicable to any of the embodiments of the invention. Just to be different from Fig. 1 and for simplification, it is shown as measuring magnetic field directly created by a coil 31 which receives a signal from a source 30. However, it is just as applicable as the tube shown in Figs. 1 and 2 to the measurement of relative position of two objects. The electronic tube 32 includes heater 33 and cathode 34 from which the electron stream is directed to plates 36 and 37. Adjacent to the electron stream are two compressor electrodes 35. Between the plates 36 and 37 is a suppressor electrode 38 whose function is to render more sensitive the changeover of the electron stream from one anode to the other. By a suitable circuit such as that shown in Fig. 4 described below, the output of the electronic tube 32 carries the signal and it may be recorded by any suitable means 40.

In Fig. 4 the values of the resistors in ohms, the values of the condensors in micro-farads and the potential differences across the power sources in volts are indicated adjacent to each unit. The electronic tube 41 includes a non-ferrous metallic shield and a cathode 42 heated by a heater 43 which is supplied with current from a six volt source of potential 44. Two compressor electrodes 45 and a suppressor electrode 47 are all connected to the metallic shield 41 and to the cathode 42. The plate circuits of the two anodes 46 include a common source of potential 48 and are connected so that the drop across the output resistor 50 changes when the electron stream shifts from one anode 46 to the other. A switch 53 is closed when the D. C. component of the tube output is to be measured, as is the case when merely measuring field strength and hence relative position of two objects as in Fig. 1. In either case this output drop is tapped off as shown and fed into an amplifier 51 which in turn operates some controlled device 52. The controlled device may be a simple indicating meter, a recording meter, a switch which in turn controls some other circuit or a motor. In embodiments of the invention such as shown in Fig. 1 for measuring the relative position of two objects, the controlled device instead of being a meter may be a motor drive for altering the position of one of the objects relative to the other until the output of the electronic tube has some predetermined value indicative of the fact that proper position of two objects has been attained; then the operation of the controlled device is stopped pending some change from this proper position. Many such arrangements are well known and the details are not described here since they would only confuse the disclosure of the main invention, but they are mentioned because they indicate the potentialities of the invention as the trigger or switch for such devices. Another direct use to which I have put my invention is the detection of magnetization in a watch hair spring. The motion of the balance wheel and hair spring is easily detected when the watch is placed near the electronic tube, but only when it is magnetized.

It is to be understood that the invention is not limited to the specific embodiments described but is of the scope of the appended claim.

I claim:

A device for detecting and measuring a shifting magnetic field comprising an electronic tube having at least one cathode and at least two anodes defining a plane orthogonal to at least a component of the magnetic field whereby the ratio of the anode currents is proportional to the field strength effective on the electronic stream from the cathode, a suppressor electrode between the two anodes, at substantially the same electrical potential as said cathode for increasing the sensitivity of changeover of the electron stream from one anode to the other, to change in effective magnetic field, compressor electrodes, also at substantially the same electrical potential as said cathode and located on opposite sides of the electron beam passing from the cathode to the two anodes for compressing said beam, and means connected to the anodes for measuring the relative direct currents therethrough.

ROBERT E. BURROUGHS.

REFERENCES CITED

The following references are of record in the file of this patent:

UNITED STATES PATENTS

| Number | Name | Date |
| --- | --- | --- |
| 1,673,681 | Hull et al. | June 12, 1928 |
| 2,105,924 | Mendenhall | Jan. 18, 1938 |
| 2,165,308 | Skellett | July 11, 1939 |
| 2,221,743 | Wagner | Nov. 12, 1940 |
| 2,287,296 | Dallos | June 23, 1942 |
| 2,314,302 | Ziebolz | Mar. 16, 1943 |
| 2,360,751 | Ziebolz | Oct. 17, 1944 |